United States Patent [19]

Olsson

[11] 4,032,380
[45] June 28, 1977

[54] METHOD OF JOINING OF INSULATED HIGH-VOLTAGE CABLES

[75] Inventor: Gotthard Valentin Olsson, Spanga, Sweden

[73] Assignee: Telefonaktiebolaget L M Ericsson, Stockholm, Sweden

[22] Filed: Jan. 19, 1976

[21] Appl. No.: 650,375

Related U.S. Application Data

[63] Continuation of Ser. No. 457,572, April 3, 1974, abandoned.

[30] Foreign Application Priority Data

Apr. 13, 1973 Sweden .......................... 7305335

[52] U.S. Cl. .................................. 156/49; 174/76
[51] Int. Cl.² .................................... B21F 15/02
[58] Field of Search .................. 156/49, 86, 56; 174/88 R, 84 R, 76; 264/272, 316, 230; 425/108

[56] References Cited

UNITED STATES PATENTS

| | | | |
|---|---|---|---|
| 3,133,846 | 5/1964 | Gandy | 156/49 |
| 3,159,513 | 12/1964 | Baier | 156/49 |
| 3,282,758 | 11/1966 | D'Ascoli | 156/86 |
| 3,678,175 | 7/1972 | Appiani et al. | 174/76 X |
| 3,691,505 | 9/1972 | Graves | 174/DIG. 8 |
| 3,783,057 | 1/1974 | McNerney | 156/49 |

Primary Examiner—David A. Simmons
Attorney, Agent, or Firm—Hane, Baxley & Spiecens

[57] ABSTRACT

There is disclosed a method of insulating stripped conductor wire portions of a cable insulated with solid polymer material so that the insulation of the stripped wire portions is substantially equivalent to the insulation of the cable. According to this method a vulcanizable insulation tape is wound about the stripped wire portion so that a layer of insulation tape is formed which is substantially flush with the insulation of the cable and then elastic tape is tightly wound about this layer of insulation tape and adjacent portions of the insulation so that the elastic tape applies an inwardly directed form of compression upon the layer of insulation tape. Heat is thereupon applied to the layer of elastic tape and through this layer to the insulation tape at a temperature and for a period of time such that the insulation tape is vulcanized. Upon completion of the vulcanization, application of heat is terminated and the layer of elastic tape is removed.

3 Claims, 1 Drawing Figure

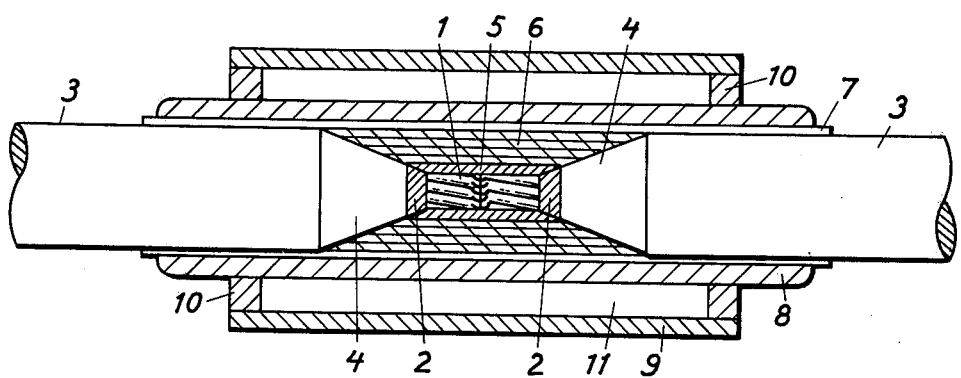

METHOD OF JOINING OF INSULATED HIGH-VOLTAGE CABLES

This is a continuation of application Ser. No. 457,572, filed Apr. 3, 1974, now abandoned.

The present invention relates to a method of producing a joint between the insulation of two jointed cables, and the invention is particularly, but not exclusively applicable to producing a joint between high-voltage cables with solid insulation of polymer material, the stripped portion around the cable joint being filled with a vulcanizable material of preferably the same type as used in the cable insulation. Such material by heating under pressure is caused to melt and vulcanize, whereby the cable joint obtains an insulation equivalent to the cable insulation.

With joints of the kind described above the filling up of the stripped portion normally takes place in the manner such that a tape is wound around the conductor, a tape of unvulcanized material of the same type as the material of the cable insulation. Nearest to the conductor the cable insulation normally comprises a layer of a semi-conducting material and for that reason a tape of a corresponding semi-conducting material is wound next to the conductor so that the insulation of the joint has the same qualities as the rest of the insulation. The melting and vulcanization of the filling material take place under pressure in order to prevent blisters and cracks in the material. Generally this pressure is achieved in the manner such that the joint is fixed in a metal form consisting of two halves, which form has a cylindrical through cavity with a diameter corresponding to that of the cable. Because of the large coefficient of expansion of the polymers, used as cable insulation (10 times the coefficient of the form material), the form must be able to expand when heated to the temperature necessary for the vulcanization process and during the cooling phase it must contract again maintaining the pressure on the joint. The necessary pressure 5–6 kg/cm² is mostly achieved by means of hydraulic or pneumatic arrangements.

In the known arrangements difficult tightening problems occur both between the form halves and at the form ends as a result of the expansion and following contraction of the insulation material. After the vulcanization the cable often becomes oval and provided with edges and irregularities which must be ground off to mechanical tensions in the often heavy cables the conductor has a tendency to displace itself from the center of the cable when the joint area is made soft by heating which results in a poorer insulation of the joint. Furthermore known arrangements require a separate form or die for each cable dimension. In addition to that they are clumsy and hardly intended to be used during active-service conditions.

These inconveniences are eliminated by the method according to the invention, the characteristics of which appear in the enclosed claims.

The invention will be described more in detail in connection with the accompanying drawing in which the FIGURE is a side view in cross-section of a cable joint or splice prepared for vulcanization.

Reference 1 denotes the conductor jointed by welding or any other procedure. On both sides of the joint the cable insulation 3 has a gradually decreasing thickness so that frusto cone-shaped portions 4 have been formed. A semi-conducting insulation layer 2 lies nearest to the conductor, which layer forms the points of the cone-shaped portions.

A tape of semi-conducting material has been wound close to the conductor on the stripped portion so that a layer 5 with the same thickness as the layer 2 is formed. Tape of the insulation material is wound in several layers 6 outside the semi-conducting layer 5, until the space between the frustoconical sections 4 has been filled in. The joint is surrounded by an elastical bandage comprising in the longitudinal direction of the cable thin tapes or ribbons 7 of metal arranged close to each other, which tapes or ribbons 7 extend over the cable insulation 3 on both sides of the joint. The elastic bandage further comprises elastic elements arranged in one or several layers 8 around the ribbons 7, the contraction forces of these elements are directed substantially across the cable. As elastic element can be used for example tapes of a rubber quality, which stands temperatures occurring during the vulcanization without loosing its elasticity and which during stretching is wound around the metal ribbons 7.

Around the joint is further arranged a heating jacket 9 consisting of a lengthwise split metal pipe. The jacket is centered by means of distance rings or spacer means, 10, of glass wool or similar material so that an annal air gap 11 is formed between the jacket and the elastic bandage. Upon vulcanization of the insulation of the joint the jacket is heated with a gas flame or with electrical heating elements arranged around the jacket (not shown), said air gap contributing in obtaining an even temperature distribution in the joint area. After the joint area has reached the necessary temperature which kept constant during a time interval suitable for the vulcanization process, the air gap also contributes in the achieving of a slow cooling which is necessary to avoid blistering. When the joint area has cooled the elastic bandage is taken away and possibly necessary smoothing of the joint is carried out.

Due to the elastic bandage about the joint an elastic form is formed which follows possible movements in the cable and prevents an eccentric placing of the conductor. The procedure according to the invention eliminates the use of equipments that are difficult to transport and manage and is very convenient for use both in manufacture and in laying of cable. Neither are investments of different sizes for different cable dimensions necessary. Upon use of rubber tapes as elastic elements the pressure in the joint can be regulated by the stretching of the tape as well as the number of wound layers. The procedure is not limited to the joining of high-voltage cables, but also it can be used upon joining of cable jackets. Neither is the procedure limited only to joining, but also applicable for repairing of damages on cables.

I claim:

1. A method of joining two lengths of cables having a central conductor surrounded by an inner layer of semi-conducting material which is in turn surrounded by an outer layer of solid polymer material, said method comprising the steps of stripping an end of each cable down to the central conductor whereby an end portion of each central conductor is exposed and the layer of semi-conducting material and layer of solid polymer material taper to form two frusto-conically shaped insulation ends; fixed by joining in a smooth abutting relationship the end portions of the central conductors; winding tape of semi-conducting material about the stripped end portions of the central conductors and in contact with the taper of the inner layer of semi-conducting material so as to form thereupon a first layer of semi-conducting material having substantially the same thickness as the inner layer of semi-conducting material on the cable whereby there is a smooth uniform transition from the inner layer of one cable to the inner layer of the other cable; then wrapping a tape of vulcanizable insulation material about the layer of semi-conducting material and the tapered portion of the outer layers so as to form a second layer substantially flush with the peripheral outline of the cable insulation; positioning against the formed second layer a plurality of axially extending metal strips, the metal strips longitudinally spanning and peripherally surrounding the formed second layer to form a third layer which is axially rigid; wrapping circumferentially around the third layer of metal strips an elastic element which lies pressure directed radially inward on the metal strips; removably jacketing said third layer with heating means; heating the layer of insulation tape to a temperature and for a period of time for causing vulcanization of the insulation tape forming the second layer; removing the heating means when vulcanization is completed; and finally removing the elastic element and the metal strips.

2. The method according to claim 1 wherein the elastic element is a rubber-like tape which during stretching is peripherally wound around the layer of metal strips.

3. The method according to claim 1 and further comprising the step of placing spacer means between the elastic element and the heating means thereby causing slow cooling upon completion of the vulcanization of the insulation tape.

* * * * *